(12) United States Patent
Jang et al.

(10) Patent No.: US 9,988,561 B2
(45) Date of Patent: Jun. 5, 2018

(54) RUBBER-BASED ADHESIVE COMPOSITION AND RUBBER-BASED ADHESIVE TAPE FOR AUTOMOBILE USING THE SAME

(71) Applicant: LG Chem, Ltd., Seoul (KR)

(72) Inventors: Ae-Jung Jang, Anyang-si (KR); Jang-Soon Kim, Seongnam-si (KR)

(73) Assignee: LG Chem, Ltd. (KR)

( * ) Notice: Subject to any disclaimer, the term of this patent is extended or adjusted under 35 U.S.C. 154(b) by 77 days.

(21) Appl. No.: 15/023,657

(22) PCT Filed: Feb. 11, 2015

(86) PCT No.: PCT/KR2015/001373
§ 371 (c)(1),
(2) Date: Mar. 21, 2016

(87) PCT Pub. No.: WO2015/126093
PCT Pub. Date: Aug. 27, 2015

(65) Prior Publication Data
US 2016/0208147 A1    Jul. 21, 2016

(30) Foreign Application Priority Data

Feb. 20, 2014 (KR) .................. 10-2014-0019383

(51) Int. Cl.
*C09J 109/06* (2006.01)
*C09J 7/02* (2006.01)
*C09J 11/08* (2006.01)

(52) U.S. Cl.
CPC .............. *C09J 109/06* (2013.01); *C09J 7/26* (2018.01); *C09J 11/08* (2013.01);
(Continued)

(58) Field of Classification Search
CPC ........ C09J 109/06; C09J 11/08; C09J 7/0289; C09J 2201/128; C09J 2409/00; C09J 2433/006
See application file for complete search history.

(56) References Cited

U.S. PATENT DOCUMENTS 5,583,182 A    12/1996  Ashara et al.
6,103,814 A    8/2000   Vandrongelen et al.
(Continued)

FOREIGN PATENT DOCUMENTS

CN    101652446 A    2/2010
CN    102775932 A    11/2012
(Continued)

OTHER PUBLICATIONS

Chinese Search Report for Application No. 201580002023.9 dated Jul. 5, 2017.
(Continued)

*Primary Examiner* — Hai Vo
(74) *Attorney, Agent, or Firm* — Lerner, David, Littenberg, Krumholz & Mentlik, LLP

(57) ABSTRACT

The present invention relates to a rubber-based adhesive composition containing: a styrene-butadiene-styrene (SBS) rubber; a hardener; and an adhesion enhancer, the adhesion enhancer being contained in 50 to 100 parts by weight based on 100 parts by weight of the styrene-butadiene-styrene (SBS) rubber, and to a rubber-based adhesive tape for an automobile using the same.

4 Claims, 1 Drawing Sheet

(52) U.S. Cl.
CPC ...... *C09J 2201/128* (2013.01); *C09J 2409/00* (2013.01); *C09J 2433/006* (2013.01)

(56) References Cited

U.S. PATENT DOCUMENTS

| | | |
|---|---|---|
| 2004/0253464 A1 | 12/2004 | Krawinkel |
| 2012/0058329 A1* | 3/2012 | Sakurai ................ C08F 287/00 428/317.3 |
| 2014/0234612 A1 | 8/2014 | Jang et al. |
| 2014/0255681 A1* | 9/2014 | Epple .................... C09J 7/0289 428/317.3 |
| 2015/0166855 A1 | 6/2015 | Lee et al. |
| 2016/0145406 A1* | 5/2016 | Bieber .................. C08J 9/0061 521/91 |

FOREIGN PATENT DOCUMENTS

| | | |
|---|---|---|
| JP | 2005-501164 A | 1/2005 |
| JP | 2005501164 A | 1/2005 |
| JP | 2006506454 A | 2/2006 |
| KR | 1020070041896 A | 4/2007 |
| KR | 20130039064 A | 4/2013 |
| TW | 201400571 A | 1/2014 |
| WO | 2013055122 A2 | 4/2013 |

OTHER PUBLICATIONS

International Search Report dated Apr. 22, 2015 corresponding to International Application No. PCT/KR2015/001373, citing the above reference(s).

\* cited by examiner

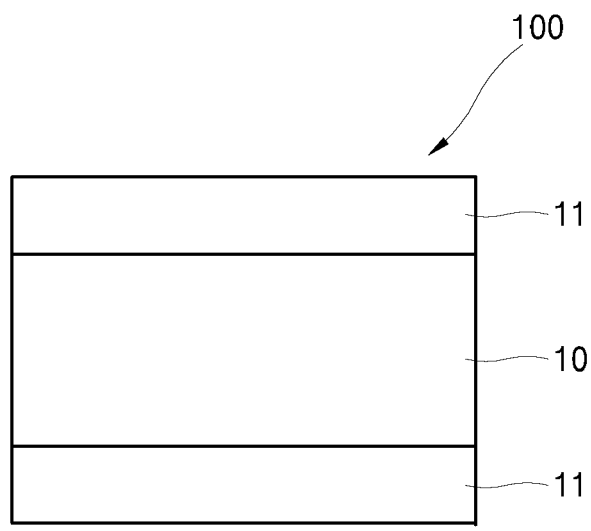

RUBBER-BASED ADHESIVE COMPOSITION AND RUBBER-BASED ADHESIVE TAPE FOR AUTOMOBILE USING THE SAME

CROSS REFERENCE TO RELATED APPLICATION

This application claims the priority of Korean Patent Application No. 10-2014-0019383, filed on Feb. 20, 2014 in the KIPO (Korean Intellectual Property Office). Further, this application is the National Phase application of International Application No. PCT/KR2015/001373 filed Feb. 11, 2015, which designates the United States and was published in Korean.

TECHNICAL FIELD

The present invention relates to a rubber-based adhesive composition and a rubber-based adhesive tape for an automobile using the same.

BACKGROUND ART

An adhesive tape for an automobile needs to tolerate physical impact or vibration from the outside as well as exposure to UV and rain drops for long time, and thus an acryl-based foam tape has been primarily used. In this regard, studies on an acryl foam tape for an automobile including an adhesive layer prepared by hardening an adhesive composition have been conducted.

An adhesive bonds two or more articles that have different physical properties. A composition of the adhesive does not change as long as the bonded articles are not intentionally moved. That is, the adhesive is a material that has viscoelastic characteristics which may bon articles with a small pressure in a short period of time.

Examples of a general adhesive composition may include a rubber-based, an acryl-based, or a silicon-based adhesive composition, but the acryl-based adhesive composition is the most widely used among these due to its various applicable characteristics. Since durability of the rubber-based adhesive composition is low due to its multiple bond, the rubber-based adhesive composition is not utilized as an adhesive composition. In this regard, studies for increasing an initial peel strength while maintaining durability of the rubber-based adhesive composition are required.

DISCLOSURE

Technical Problem

It is an aspect of the present invention to provide a rubber-based adhesive composition including a styrene-butadiene-styrene (SBS) rubber; a hardener; and an adhesion enhancer, wherein an amount of the adhesion enhancer is in a range of about 50 parts to about 100 parts by weight based on 100 parts by weight of the SBS rubber.

However, technical problems to be resolved by the present invention are not limited thereto, and other problems that are not described herein may be clearly understood by one of ordinary skill in the art in light of the description below.

Technical Solution

In accordance with one aspect of the present invention, a rubber-based adhesive composition includes a styrene-butadiene-styrene (SBS) rubber; a hardener; and an adhesion enhancer, wherein an amount of the adhesion enhancer is in a range of about 50 parts to about 100 parts by weight based on 100 parts by weight of the SBS rubber.

An amount of styrene of the SBS rubber may be in a range of 20 wt % to 30 wt %.

The hardener may be at least one selected from the group consisting of 1,6-hexanediol diacrylate, dipentaerythritol hexaacryalte, tetramethylolmethane tetraacrylate, tetramethylolmethane triacrylate, trimethylolpropane triacrylate, 1,6-bis(3-acryloyloxy-2-hydroxypropyloxy)hexane, polyethylene glycol diacrylate, pentaerythritol triacrylate, and a hexamethylene diisocyanate urethane prepolymer.

The adhesion enhancer may be a hydrogenated ring-type olefin-based resin.

A softening point of the adhesion enhancer may be 90° C. or higher.

The rubber-based adhesive composition may further include at least one selected from the group consisting of an ultra-violet (UV) stabilizer, a photoinitiator, a thermal initiator, an antioxidant, a filler, and a plasticizer.

In accordance with one aspect of the present invention, a rubber-based adhesive tape for an automobile includes an acryl foam layer; and a rubber-based adhesive layer prepared by hardening the rubber-based adhesive composition, wherein the rubber-based adhesive layer is formed on both surfaces of the acryl foam layer.

A hardening degree (a gel amount) in the rubber-based adhesive layer may be in a range of about 30% to about 50%.

Advantageous Effects

The present invention is capable of preparing a rubber-based adhesive composition including a styrene-butadiene-styrene (SBS) rubber; a hardener; and an adhesion enhancer, wherein an amount of the adhesion enhancer is in a range of 50 parts to 100 parts by weight based on 100 parts by weight of the SBS rubber. Since the rubber-based adhesive composition according to an embodiment of the present invention includes a large amount of the adhesion enhancer, the rubber-based adhesive composition may have excellent initial peel strength with respect to various materials while maintaining constant durability, and thus the rubber-based adhesive composition may be used as a rubber-based adhesive tape for an automobile.

DESCRIPTION OF DRAWINGS

FIG. 1 is a schematic cross-sectional view of a rubber-based adhesive tape for an automobile according to an embodiment of the present invention.

BEST MODE

While studying a rubber-based adhesive tape for an automobile, the present inventors have confirmed that a rubber-based adhesive composition may have excellent initial peel strength with respect to various materials while maintaining constant durability by containing a large amount of an adhesion enhancer, and thus completed the present invention.

Hereinafter, with reference to drawings, embodiments of the present invention are described in detail in a manner that one of ordinary skill in the art may perform the embodiments without undue difficulty. The present invention may be embodied in various forms, and the scope of the present invention is not limited to examples provided herein.

Like reference numerals in the drawings denote like elements throughout the specification, and thus their description will be omitted.

In the drawings, the thicknesses of layers and regions are exaggerated for clarity. Also, in the drawings, thicknesses of some layers and regions are arbitrarily illustrated for convenience of explanation. The present invention is directed to a rubber-based adhesive composition including a styrene-butadiene-styrene (SBS) rubber; a hardener; and an adhesion enhancer, wherein an amount of the adhesion enhancer is in a range of 50 parts to 100 parts by weight based on 100 parts by weight of the SBS rubber.

The SBS rubber has a low glass transition temperature (Tg), consists of hydrocarbons, and has a low surface energy, and thus wetting a material with the SBS rubber may be better than with a conventional acryl-based adhesive composition. Also, the SBS rubber is one type of butadiene rubber, which has a hard segment property compared to other rubbers, i.e., an isoprene rubber such as a styrene-isoprene-styrene (SIS) rubber, and thus high-temperature durability of the SBS rubber is particularly good during a hardening process. Also, since a degree of the hardening may vary even when the same amount of the same hardener is added, the SBS rubber is preferable for a material of a rubber-based adhesive tape for an automobile.

A styrene amount of the SBS rubber is preferably in a range of 20 wt % to 30 wt %, but the amount is not limited thereto. Here, when the styrene amount is less than 20 wt %, cohesive strength may be insufficient, and when the styrene amount is greater than 30 wt %, adhesiveness may be insufficient.

Also, an amount of the SBS rubber is preferably in a range of 10 parts to 30 parts by weight based on 100 parts by weight of the rubber-based adhesive composition. Here, when the amount of the SBS rubber is less than 10 parts by weight based on 100 parts by weight of the rubber-based adhesive composition, although a coating property of the SBS rubber may not be a problem, the amount of a solvent is relatively increased, and thus the SBS rubber is disadvantageous in terms of the cost. Also, an amount of a solvent volatilized during coating increases, and thus a hardening process may be difficult when some solvent is unvolatilized and remained. Further, when the amount of the SBS rubber is greater than 30 parts by weight based on 100 parts by weight of the rubber-based adhesive composition, a viscosity increases, and thus a coating property.

The hardener may be preferably at least one selected from the group consisting of 1,6-hexanediol diacrylate, dipentaerythritol hexaacryalte, tetramethylolmethane tetraacrylate, tetramethylolmethane triacrylate, trimethylolpropane triacrylate, 1,6-bis(3-acryloyloxy-2-hydroxypropyloxy) hexane, polyethylene glycol diacrylate, pentaerythritol triacrylate, and a hexamethylene diisocyanate urethane prepolymer. Also, the hardener may be preferably 1,6-hexanediol diacrylate or tetra(ethylene glycol)diacrylate, but examples of the hardener is not limited thereto.

Particularly, a weight average molecular weight (Mw) of 1,6-hexanediol diacrylate is 226.27, which is around 200. Here, when a molecular structure is too long, the hardening process may be loosely performed, and thus durability may deteriorate, and when a molecular structure is too long, the hardening process may be tightly performed, which may result in decreasing peel strength.

An amount of the adhesion enhancer may be preferably in a range of 50 parts to 100 parts by weight based on 100 parts by weight of the SBS rubber or in a range of 60 parts to 80 parts by weight, but the amount of the adhesion enhancer is not limited thereto. Here, when the amount of the adhesion enhancer is less than the ranges above based on 100 parts by weight of the SBS rubber, peel strength may be insufficient, and when the amount of the adhesion enhancer is greater than the ranges above, the adhesion enhancer is not an UV-hardening type, which does not participate the hardening process, and thus a degree of the hardening may decrease and durability may deteriorate.

The adhesion enhancer may be a hydrogenated ring-type olefin-based resin.

In particular, the adhesion enhancer is not essentially hydrogenated and may use a ring-type olefin-based resin obtained by polymerization according to the need, but whether the adhesion enhancer is hydrogenated or not may be determined in consideration of a softening point, adhesive strength increasing effects, and heat tinting.

After terminating a ring-opening polymerization process, a hydrogenation reaction for adding hydrogen to an olefin unsaturated bond in molecules may be performed by using a copolymerization solution itself or by using a copolymerization solution prepared by dissolving the ring-opening polymer in an appropriate solvent after removing catalyst residues or non-reacted monomers.

The hydrogenation reaction may be performed under conditions including a general hydrogen pressure in a range of 1.0 MPa to 15 MPa and a temperature in a range of 50 ° C. to 200 ° C. Examples of a hydrogenation catalyst may include an irregular catalyst including a metal selected from palladium, platinum, platina, rhodium, iridium, ruthenium, and nickel contained in a carrier selected from silica, alumina, zeolite, diatomite, magnesia, carbon, and calcium carbonate; or a regular catalyst such as nickel octanoate/triethyl aluminum, nickel naphthenate/triethylaluminum, cobalt octanoate/triethylaluminum, cobalt octanoate/n-butyl lithium, bis-cyclopentadienyl titanium dichloride, diethylaluminum chloride, palladium acetate/triethyl aluminum, tris(triphenylphosphine)chloro rhodium, tris(triphenylphosphine)hydride carbonyl chlororuthenium, tris(tritolylphosphine)hydride carbonyl chlororuthenium, tris(trixylylphosphine)hydride carbonyl chlororuthenium, tris (tricyclohexylphosphine)hydride carbonyl chlororuthenium, bis(triphenylphosphine)dichlororuthenium.

A hydrogenation catalyst is generally may be used in a range of 10 ppm to 1000 ppm in terms of transition metal atom with respect to a general ring-opening copolymer. The hydrogenated ring-type olefin-based resin may have excellent thermal stability as a hydrogenation ratio of an olefin unsaturated bond in molecules increases. As a result, thermal degradation by heating or degradation caused by oxygen during a de-solvent process, a pelletizing process, and a product molding process may be suppressed.

A commonly antioxidant, i.e., a phenol-based antioxidant or a hydroquinone-based antioxidant such as 2,6-di-t-bnutyl, 4-methylphenol, 4,4'-thiobis-(6-t-butyl-3-methylphenol), 1,1'-bis(4-hydroxyphenyl)cyclohexane, 2,2'-methylenebis (4-ethyl-6-t-butylphenol), 2,5-di-t-butylhydroquinone, or pentaerythrityl-tetrakis[343 ,5-di-t-butyl-4-hydroxyphenyl) propionate, may be added to the hydrogenated ring-type olefin-based resin. Also, the hydrogenated ring-type olefin-based resin may be mixed with a phosphorus antioxidant, such as tris(4-methoxy-3,5-diphenyl)phosphite, tris(nonylphenyl)phosphite, tris(2,4-di-t-butylphenyl)phosphite, bis (2,6-di-t-butyl-4-methylphenyl)pentaerythritoldiphosphite, and bis(2,4-di-t-butylphenyl)pentaerythritoldiphosphite to improve oxidation stability.

Also, a softening point of the adhesion enhancer may be 90° C. or higher.

In particular, the softening point of the adhesion enhancer may be about 90° C. or higher, or, for example, in a range of about 95° C. to about 160° C. The softening point generally denotes a temperature at which a material starts to be modified or softened by heating, and thus modification and softening of the adhesion enhancer may start at about 90° C.

For example, when the softening point of the adhesion enhancer is maintained at about 90° C. or higher, the adhesion enhancer maintains a glassy state under conditions for high-temperature reliability, which decreases a thermal strain, and thus high-temperature reliability may be easily secured.

However, when the softening point of the adhesion enhancer is lower than about 90° C., the softening of the adhesion enhancer starts at a high temperature, and thus durability of the adhesion enhancer may deteriorate. For example, when the softening point of the adhesion enhancer is higher than about 160° C., adhesion enhancing effects of an adhesive at room temperature may be insignificant.

Herein, Regalite 1125 available from Eastman was used as an adhesion enhancer, and Regalite 1125 is 100% hydrogenated and has characteristics that maintain a softening point at 125° C.

Also, the rubber-based adhesive composition may further include at least one selected from the group consisting of an ultra-violet (UV) stabilizer, a photoinitiator, a thermal initiator, an antioxidant, a filler, and a plasticizer in addition to the SBS rubber, hardener, and adhesion enhancer. These additives may be appropriately controlled within the ranges that do not deteriorate physical properties of the adhesion composition, and thus the rubber-based adhesive composition may further include additives such as a pigment, an UV stabilizer, a dispersing agent, an antifoam, a thickener, a plasticizer, a tackifier resin, a silane coupling agent, or a brightening agent.

Also, the present invention is directed to a rubber-based adhesive tape for an automobile, and the rubber-based adhesive tape includes an acryl foam layer; and a rubber-based adhesive layer prepared by hardening the rubber-based adhesive composition, wherein the rubber-based adhesive layer is formed on both surfaces of the acryl foam layer.

FIG. 1 is a schematic cross-sectional view of a rubber-based adhesive tape for an automobile 100 according to an embodiment of the present invention.

As shown in FIG. 1, the rubber-based adhesive tape for an automobile 100 includes an acryl foam layer 10; and a rubber-based adhesive layer 11 prepared by hardening the rubber-based adhesive composition, wherein the rubber-based adhesive layer is formed on both surfaces of the acryl foam layer 10.

The acryl foam layer 10 includes an acryl-based resin. Examples of the acryl-based resin may include (meth) acrylate ester-based monomers having a C1-C12 alkyl group and an acrylic acid. Here, when the alkyl group included in the monomers is too long, cohesive strength of the adhesive decreases, and a glass transition temperature (Tg) or adhesiveness may not be controlled, and thus using a (meth) acrylate ester-based monomer having a C1-C 12 alkyl group may be preferable.

A hardening degree (a gel amount) of the rubber-based adhesive layer 11 may be preferably in a range of 30% to 50%, or, for example, 40% to 50%, but the hardening degree is not limited thereto. Here, when the hardening degree (a gel amount) of the rubber-based adhesive layer 11 is less than the ranges above, durability of the rubber-based adhesive layer 11 may deteriorate, and when the hardening degree (a gel amount) of the rubber-based adhesive layer 11 is greater than the ranges above, the rubber-based adhesive layer 11 may be too hard that peel strength thereof may deteriorate.

The rubber-based adhesive layer 11 may secure thermal resistance through hardening of the rubber-based adhesive composition. Here, the rubber-based adhesive composition may be hardened by using at least one energy source selected from the group consisting of heat, ultraviolet light, visible light, an infrared radiant ray, and an electronic beam radiant ray.

As used herein, the rubber-based adhesive composition is hardened by using UV light, and this is economically advantageous compared to cases using other energy sources. When the rubber-based adhesive composition is hardened by using UV light, an exposure dose of UV light may be preferably in a range of 500 mJ/cm$^2$ to 1000 mJ/cm$^2$, but the exposure dose of UV light is not limited thereto.

The rubber-based adhesive layer 11 may further include an outer layer (not shown). The outer layer may be prepared by using various plastic film, paper, non-woven fabric, glass, or metal. For example, the outer layer may be preferably prepared by using plastic film such as polyethylene-terephthalate (PET), but examples of the outer layer are not limited thereto.

The rubber-based adhesive tape for an automobile 100 is particularly useful in bonding components, such as lateral molded articles of vehicles, emblems, pin-stripping, and other objects, to an outer surface of substrates, such as automobiles, motorcycles, bicycles, vessels (for example, ships, yachts, boats, and personal ships), aircraft, and other types of land, marine, and air vehicles.

The rubber-based adhesive tape for an automobile 100 exhibits resistance to components, such as petroleum substances including gasoline, lubricants, water-based substances including detergents, front glass cleaning liquids, rainwater, saltwater, and mixtures thereof, which vehicles may frequently encounter when a substrate including such substances is used. In addition, since the rubber-based adhesive tape for an automobile 100 exhibits resistance to physical force and improved initial peel strength, the adhesive tape prevents an object from being removed from the substrate due to physical force, such as impact, catch, breakage, or other force.

In this regard, the rubber-based adhesive composition according to an embodiment of the present invention includes a large amount of the adhesion enhancer, the rubber-based adhesive composition may have excellent initial peel strength with respect to various materials while maintaining constant durability, and thus the rubber-based adhesive composition may be used as a rubber-based adhesive tape for an automobile.

Hereinafter, the present invention will be explained in more detail with reference to some examples. It should be understood that these examples are provided for illustration only and are not to be in any way construed as limiting the present invention.

EXAMPLE

Example 1

0.4 g of 1,6-hexanediol diacrylate, as a hardener, and 15 g of Regalite 1125, as an adhesion enhancer were added to 25 g of a styrene-butadiene-styrene (SBS) rubber, and then 75 g of toluene, as a solvent, was added thereto and stirred to prepare a rubber-based adhesive composition.

Example 2

A rubber-based adhesive composition was prepared in the same manner as in Example 1, except that 20 g of Regalite 1125, as an adhesion enhancer, was added to the mixture.

Example 3

A rubber-based adhesive composition was prepared in the same manner as in Example 1, except that 0.4 g of tetra (ethylene glycol) diacrylate was used instead of 1,6-hexanediol diacrylate, as a hardener.

Comparative Example 1

Benzoyl peroxide, as a hardener, was added to 25 g of an acryl resin. An adhesion enhancer was not added, but 75 g of toluene was added thereto, and the mixture was stirred to prepare an acryl-based adhesive composition.

Comparative Example 2

A rubber-based adhesive composition was prepared in the same manner as in Example 1, except that 10 g of Regalite 1125, as an adhesion enhancer, was added to the mixture.

Comparative Example 3

A rubber-based adhesive composition was prepared in the same manner as in Example 1, except that 15 g of a terpene phenolic resin (SP-560, SI group) was added instead of Regalite 1125, as an adhesion enhancer.

Experimental Example

1. Hardening Degree (Gel amount) Measurement

The adhesive compositions prepared in Examples 1 to 3 and Comparative Examples 1 to 3 were coated on a PET release film by using a knife coater (at a coating thickness in a range of 30 μm to 35 μm. Subsequently, the coated rubber-based adhesive compositions were placed under a metal halide lamp, irradiated with UV light of 10 mW/cm for about 3 minutes to perform a hardening process, and thus a rubber-based adhesive was prepared. The rubber-based adhesive thus prepared was cut into a size of 1 inch×1 inch (a horizontal line×a vertical line) to prepare a sample, a weight of the sample was measured, 50 ml of toluene, as a solvent, was added to a PET vessel with the sample, and the resultant was remained at room temperature for 24 hours. The fully swollen rubber-based adhesive was filtered through a 200 mesh in a size of 130 mm×130 mm, dried in an oven at a temperature of 110° C. for 4 hours, and a weight of the resultant was measured. A difference between the initial weight of the adhesive and the final weight of the adhesive was calculated to measure the final gel amount.

2. Initial Peel Strength Measurement

The rubber-based adhesives, which were hardened results of the rubber-based adhesive composition prepared in Examples 1 to 3 and Comparative Examples 1 to 3 were cut into a size of 1 inch×1 cm (a horizontal lin×a vertical line) to prepare a sample. One surface of the sample was attached to ABS, and the other surface was attached to paint. Then, the sample, ABS, and paint were attached by pressing with a 2-kg roller back and forth twice, and an initial peel strength of the sample was measured at a peeling rate of 300 mm/min and a peeling angle of 180 degrees by using a peel strength measuring device after 30 minutes at room temperature (23° C.).

The results of measuring hardening degrees (gel amounts) and initial peel strengths are shown in Table 1.

TABLE 1

| Sample | Resin (g) | Hardener (g) | Adhesion enhancer (g) | Hardening degree (%) | Initial peel strength (gf/in) ABS | Paint |
|---|---|---|---|---|---|---|
| Example 1 | SBS rubber 25 | HDDA 0.4 | Regalite 1125 15 | 48 | 1523 | 1875 |
| Example 2 | SBS rubber 25 | HDDA 0.4 | Regalite 1125 20 | 35 | 2373 | 2454 |
| Example 3 | SBS rubber 25 | TTEDGA 0.4 | Regalite 1125 15 | 41 | 1823 | 2043 |
| Comparative Example 1 | Acryl resin 25 | BPO 0.4 | Regalite 1125 0 | 55 | 1521 | 1834 |
| Comparative Example 2 | SBS rubber 25 | HDDA 0.4 | Regalite 1125 10 | 62 | 1398 | 1632 |
| Comparative Example 3 | SBS rubber 25 | HDDA 0.4 | SP-560 15 | 52 | 1325 | 1643 |

HDDA: 1,6-hexanediol diacrylate
BPO: benzoyl peroxide

As shown in Table 1, it may be confirmed that the rubber-based adhesive compositions prepared in Examples 1 to 3 include a large amount of the adhesion enhancer, and thus the rubber-based adhesive composition may have excellent initial peel strength with respect to various materials while maintaining constant durability.

One or more embodiments described above are provided herein as examples, and it will be understood by those of ordinary skill in the art that various changes in form and details may be made therein without undue difficulty without changing technical concepts or necessary characteristics of the present invention. Therefore, it should be understood that embodiments described herein should be considered in a descriptive sense only and not for purposes of limitation.

The invention claimed is:

1. A rubber-based layer prepared by hardening a rubber-based adhesive composition, wherein the rubber-based adhesive composition consists of:
   a styrene-butadiene-styrene (SBS) rubber;
   a hardener;
   an adhesion enhancer;
   an antifoaming agent, and
   optionally further consisting of at least one selected from the group consisting of an ultra-violet (UV) stabilizer, a photoinitiator, a thermal initiator, an antioxidant, and a filler,
   wherein the adhesion enhancer is a hydrogenated ring-type olefin-based resin,
   wherein an amount of the adhesion enhancer ranges from 50 parts to 80 parts by weight based on 100 parts by weight of the SBS rubber,
   wherein an amount of the SBS rubber ranges from 10 to 30 parts by weight based on 100 parts by weight of the rubber-adhesive composition,
   wherein an amount of the adhesion enhancer ranges from 5 to 15 parts by weight based on 100 parts by weight of the rubber-adhesive composition,
   wherein a styrene amount of the SBS rubber ranges from 20 wt % to 30 wt %, and wherein a hardening degree (Gel amount) in the rubber-based adhesive layer ranges from 30% to 50%.

2. The rubber-based adhesive layer of claim 1, wherein the hardener is at least one selected from the group consisting of 1,6-hexanediol diacrylate, dipentaerythritol hexaacrylate, tetramethylolmethane tetraacrylate, tetramethylolmethane triacrylate, trimethylolpropane triacrylate, 1,6-bis(3-acryloyloxy-2-hydroxypropyloxy)hexane, polyethylene glycol diacrylate, pentaerythritol triacrylate, and a hexamethylene diisocyanate urethane prepolymer.

3. The rubber-based adhesive layer of claim 1, wherein a softening point of the adhesion enhancer is 90° C. or higher.

4. A rubber-based adhesive tape for an automobile, the tape comprising
   an acryl foam layer; and
   a rubber-based adhesive layer claim 1, wherein the rubber-based adhesive layer is formed on both surfaces of the acryl foam layer.

* * * * *